United States Patent
Hsu (10) Patent No.: US 9,189,423 B2
(45) Date of Patent: Nov. 17, 2015

(54) METHOD AND APPARATUS FOR CONTROLLING CACHE REFILLS

(75) Inventor: Lisa Hsu, Kirkland, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 966 days.

(21) Appl. No.: 13/312,382

(22) Filed: Dec. 6, 2011

(65) Prior Publication Data

US 2013/0145104 A1   Jun. 6, 2013

(51) Int. Cl.
*G06F 13/00* (2006.01)
*G06F 12/12* (2006.01)

(52) U.S. Cl.
CPC ........... *G06F 12/126* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 8,244,984 B1* | 8/2012 | Glasco et al. ................. | 711/133 |
| 2002/0156980 A1* | 10/2002 | Rodriguez .................... | 711/136 |
| 2006/0143392 A1* | 6/2006 | Petev et al. ................... | 711/133 |
| 2009/0019209 A1* | 1/2009 | Shen et al. .................... | 711/100 |
| 2009/0271574 A1* | 10/2009 | Larkby-Lahet et al. ...... | 711/133 |
| 2014/0129779 A1* | 5/2014 | Frachtenberg et al. ....... | 711/136 |
| 2014/0181411 A1* | 6/2014 | Thottethodi et al. .......... | 711/133 |

* cited by examiner

*Primary Examiner* — Sean D Rossiter (57) ABSTRACT

A method and apparatus are provided for controlling a cache. The cache includes a plurality of storage locations, each having a priority associated therewith, and wherein the cache evicts data from one or more of the storage locations based on the priority associated therewith. The method comprises: storing historical information regarding data being evicted from the cache; retrieving data from a secondary memory in response to a miss in the cache; assigning a priority to the retrieved data based on the historical information; and storing the retrieved data in the cache with an indication of the assigned priority.

14 Claims, 8 Drawing Sheets

METHOD AND APPARATUS FOR CONTROLLING CACHE REFILLS

CROSS-REFERENCE TO RELATED APPLICATIONS

Not applicable.

BACKGROUND

The disclosed subject matter relates generally to memory systems, and, more particularly, to reducing power consumption of a memory system.

Memory in a processor system commonly includes a temporary storage system that includes both dynamic random access memory (DRAM) and one or more caches formed from static random access memory (SRAM). Generally, DRAM is relatively inexpensive, and thus, is commonly employed in large blocks to store large volumes of data, but is relatively slow when retrieving the data. Caches, on the other hand, are constructed from high-speed SRAM cells that are substantially faster than DRAM, but are relatively more expensive.

Many processor systems employ a relatively small cache and a relatively large DRAM. Commonly, this type of processor system is designed such that the cache is loaded with a subset of the data found in the DRAM that is likely to be used by the processor system. Thus, the processor system normally accesses the high-speed cache, and only occasionally accesses the lower-speed DRAM. By carefully selecting the subset of data loaded into the cache, the processor system can operate at a relatively high speed without the expensive of including a large block of high-speed cache.

Since the cache is holding only a subset of the data that may be accessed by the processor system, "misses" will occasionally occur when the processor system requests data that has not been loaded into the cache. When such a miss occurs, the memory system will access DRAM to retrieve the desired data, and the retrieved data will be loaded or "filled" into the cache. Of course, if the cache is full, then the cache will need to eject or otherwise remove some old data from the cache to make room for the newly retrieved data.

In some applications, caches generally treat all data fills the same way: store the new data in a most recently used (MRU) location in the cache because the new data is assumed to be "useful," in that it will be accessed or "touched" again. The general presumption that all data, because it have been touched once will be touched again in the near future, has been extremely useful in the past and generated good performance benefits, and the pain of being wrong has been generally bearable. Thus, caches have typically erred on the side of caution and the set of data in a cache generally significantly exceeds the set of data that will be touched again. However, increasing pressure on caches from multiple directions makes it increasingly important to be able to use cache space more efficiently by having its space taken up by more useful data, i.e. data that will be reused.

BRIEF SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for controlling a cache, wherein the cache includes a plurality of storage locations, each having a priority associated therewith, and wherein the cache evicts data from one or more of the storage locations based on the priority associated therewith. The method comprises: storing historical information regarding data being evicted from the cache; retrieving data from a secondary memory in response to a miss in the cache; assigning a priority to the retrieved data based on the historical information; and storing the retrieved data in the cache with an indication of the assigned priority.

Another aspect of the disclosed subject matter is seen in a cache control, wherein a cache includes a plurality of storage locations, at least some of the storage locations having a priority associated therewith, and wherein data is evicted from one or more of the storage locations based on the priority associated therewith. The cache control comprises a historic information check and a cache refill control. The historic information check is adapted to store historical information regarding data being evicted from the cache. The cache refill control is adapted to receive data retrieved from a secondary memory, assign a priority to the retrieved data based on the historical information, and store the retrieved data in the cache with an indication of the assigned priority.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
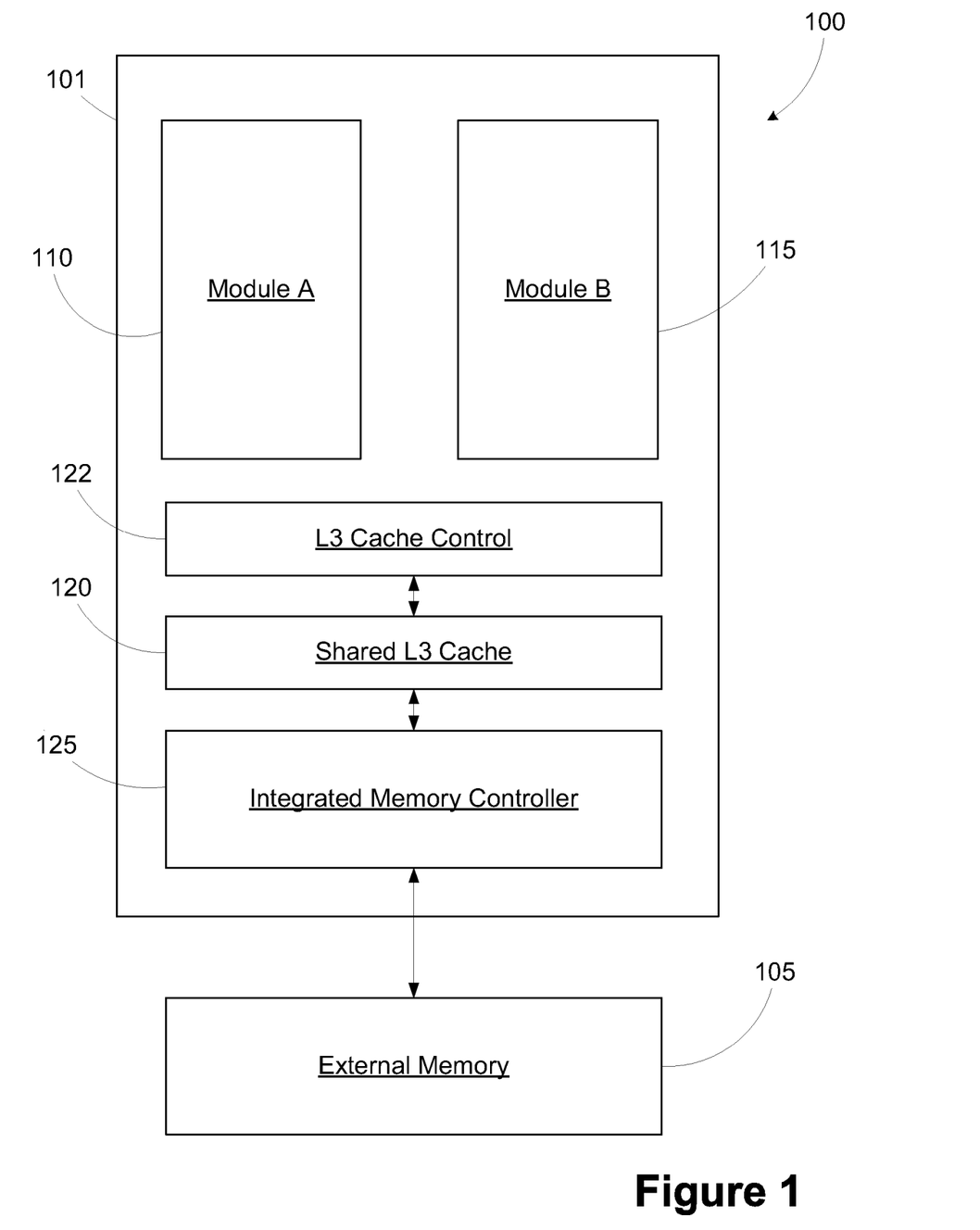
FIG. 1 is a block level diagram of a processing system, including a microprocessor interfaced with external memory.

Referring now to the drawings wherein like reference numbers correspond to similar components throughout the several views and, specifically, referring to FIG. 1, the disclosed subject matter shall be described in the context of a processor system 100 comprised of a processor 101 coupled with an external memory 105. Those skilled in the art will recognize that a processor system 100 may be constructed from these and other components. However, to avoid obfuscating the embodiments described herein, only those components useful to an understanding of the present embodiment are included.

In one embodiment, the processor 101 employs a pair of substantially similar modules, module A 110 and module B 115. The modules 110, 115 are substantially similar and include processing capability (as discussed below in more detail in conjunction with FIG. 2). The modules 110, 115 engage in processing under the control of software, and thus access memory, such as external memory 105 and/or caches, such as a shared L3 cache 120 and/or internal caches (discussed in more detail below in conjunction with FIG. 2). An integrated memory controller 125 and an L3 Cache control 122 may be included within the processor 100 to manage the operation of the external memory 105 and the L3 Cache 120, respectively. The integrated memory controller 125 further operates to interface the modules 110, 115 with the conventional external semiconductor memory 105. Those skilled in the art will appreciate that each of the modules 110, 115 may include additional circuitry for performing other useful tasks, Turning now to FIG. 2, a block diagram representing one exemplary embodiment of the internal circuitry of either of the modules 110, 115 is shown. Generally, the module 110 comprises two processor cores 200, 201 that include both individual components and shared components. For example, the module 110 includes shared fetch and decode circuitry 203, 205, as well as a shared L2 cache 235. Both of the cores 200, 201 have access to and utilize these shared components.

Figure 2:
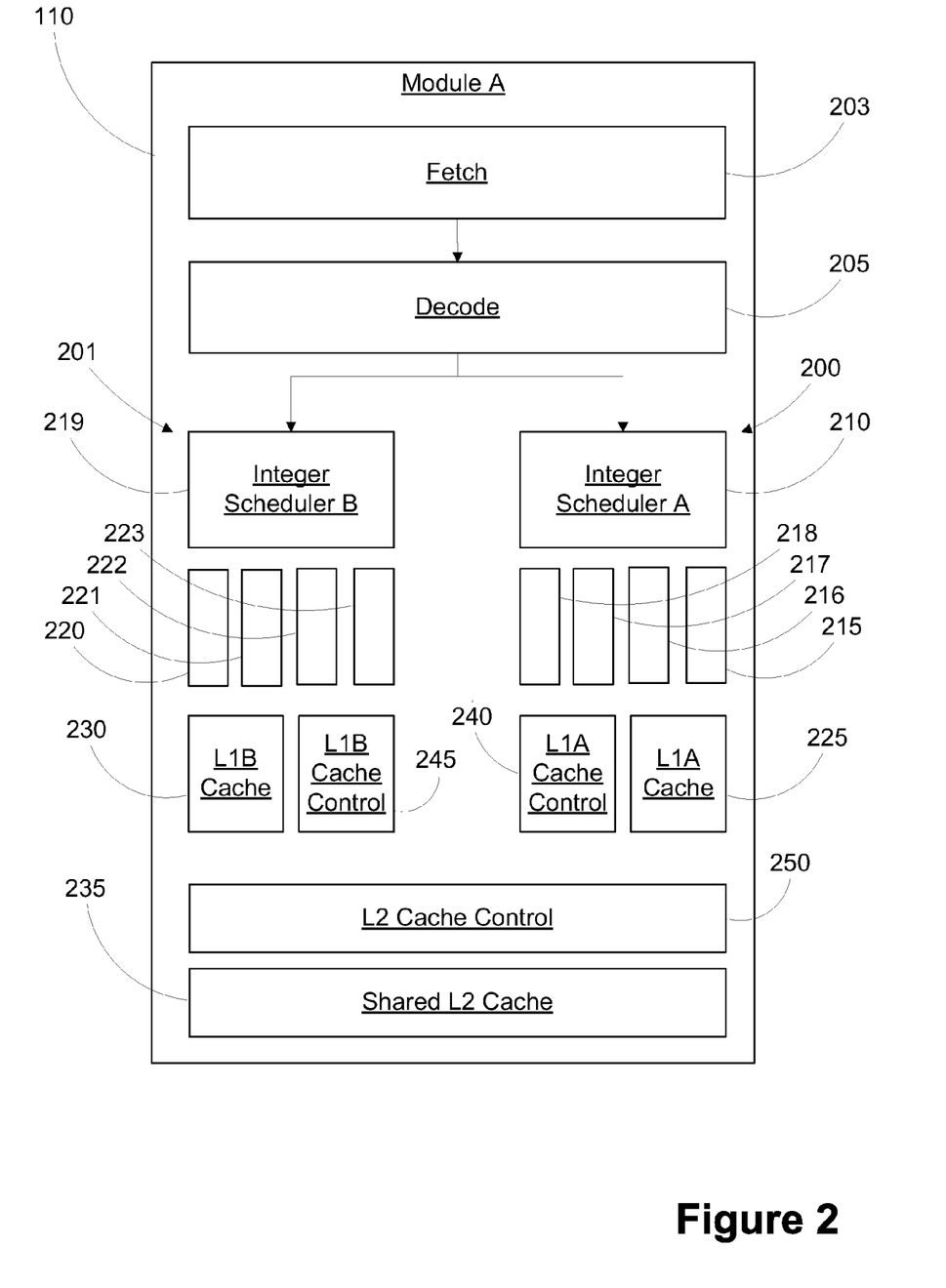
FIG. 2 is a simplified block diagram of a dual-core module that is part of the microprocessor of FIG. 1 and includes multiple caches and cache controls.

The processor core 200 also includes components that are exclusive to it. For example, the processor core 200 includes an integer scheduler 210, four substantially similar, parallel pipelines 215, 216, 217, 218, and an L1 Cache 225. Likewise, the processor core 201 includes an integer scheduler 219, four substantially similar, parallel instruction pipelines 220, 221, 222, 223, and an L1 Cache 230.

The operation of the module 110 involves the fetch circuitry 203 retrieving instructions from memory, and the decode circuitry 205 operating to decode the instructions so that they may be executed on one of the available pipelines 215-218, 220-223. Generally, the integer schedulers 210, 219 operate to assign the decoded instructions to the various instruction pipelines 215-218, 220-223 where they are speculatively executed. During the speculative execution of the instructions, the instruction pipelines 215-218, 220-223 may access the corresponding L1 Caches 225, 230, the shared L2 Cache 235, the shared L3 cache 120 and/or the external memory 105. Operation of the L1 Caches 225, 230 and the L2 Cache 235 may each be controlled by corresponding Cache Controls 240, 245, 250. Generally, the caches and external memory are arranged in a hierarchical fashion with the L1B and L1A Caches 230, 240 at the highest or first level, the L2 Cache 250 at the second level, the L3 Cache 120 at the third level, and external memory 105 at the fourth level. Thus, any request from data will be sequentially submitted through each hierarchical level until it is found and retrieved. For example, an exemplary request for data begins with an inspection of the L1B Cache 230 first for the requested data. In the event that the requested data is not found in the L1B cache 230, then the L2 Cache 250 is inspected for this same data. A hit in the L2 Cache 250 causes the desired data to be retrieved therefrom and delivered to the first level L1B cache 230 and stored therein. In the event that the L1B cache 230 is already full, then the L1B cache controller 245 will evict an entry from the L1B Cache 230, and the evicted entry will be delivered to and stored in the L2 Cache 235. Similar interoperations occur between the L2 and L3 Caches 235, 120 and between the L3 Cache 120 and the external memory 105.

Those skilled in the art will appreciate that the cache controls 122, 240, 245, 250 may be implemented as completely separate devices with little or no interaction therebetween, they may be implemented as devices that share some components, or they may be implemented as a single device capable of managing the operation of all of the caches 120, 225, 230, 235.

Figure 3:
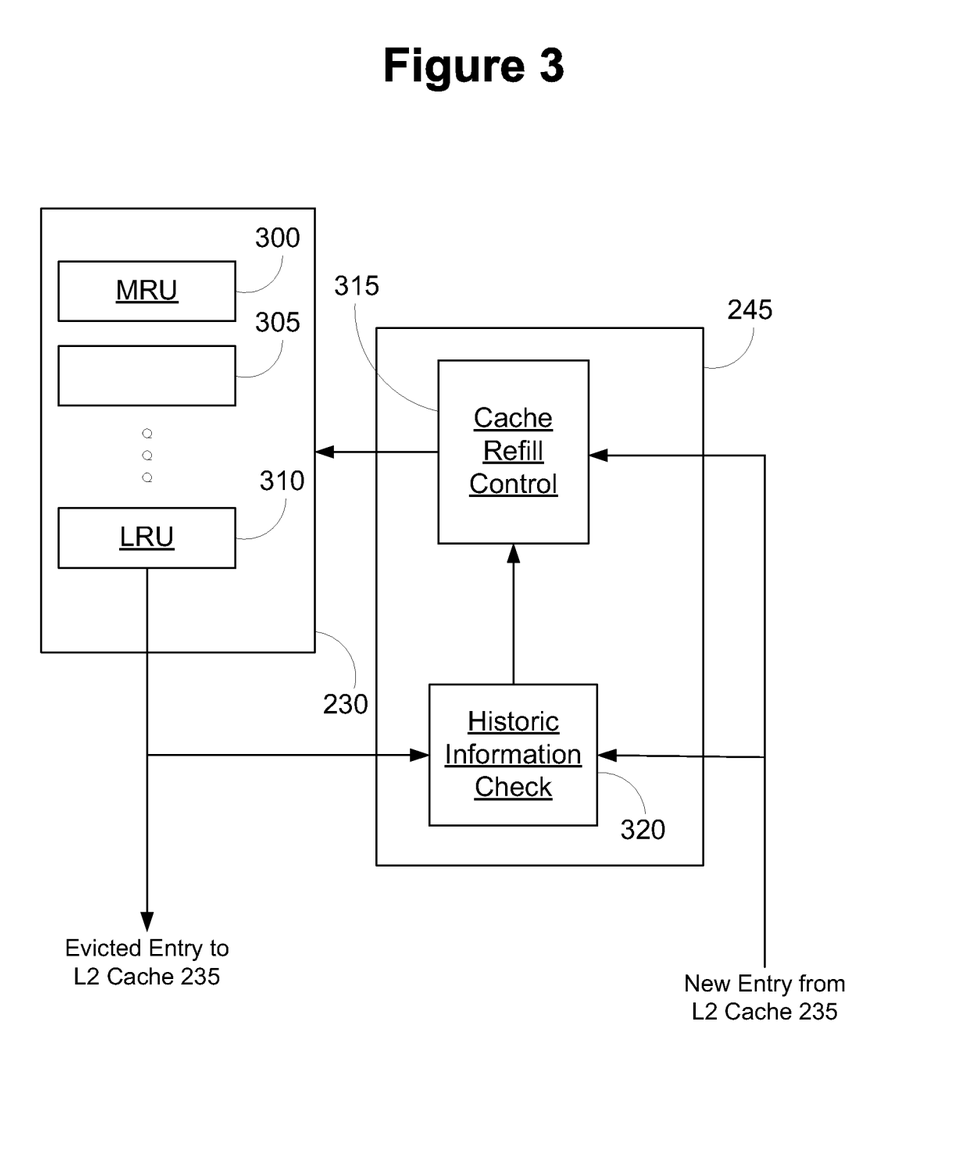
FIG. 3 is a block diagram of one embodiment of the cache and cache control of FIG. 2.

In one embodiment, it may be useful to control the refill and eviction processes for one or more of the caches 120, 225, 230, 235 to increase the likelihood that each of the caches 120, 225, 230, 235 will retain entries that are likely to be requested during the operation of the processor 101. Turning now to FIG. 3, block diagrams of the L1B Cache 230 and the L1B Cache Control 245 are shown for illustrative purposes, but those skilled in the art will appreciate that similar structure and operation may be used with respect to the L1A Cache 225 and the L1A Cache Control 240, the L2 Cache 235 and the L2 Cache Control 250, and the L3 Cache 120 and the L3 Cache Control 120. FIG. 3 generally illustrates the organization of the L1B Cache 230 and the components that are involved in the refill and eviction process for the illustrated embodiment.

Generally, the L1B Cache 230 may take on any of a variety of forms, however, for purposes of illustrating the instant embodiment, the L1B Cache 230 is a set associative cache having a plurality of entries, lines or blocks 300-310 that are prioritized to indicate the likelihood that they will be requested by the processor 101. For example, the entry 300 is identified as having the highest priority and is designated as the Most Recently Used (MRU) entry 300. Conversely, the entry 310 is identified as having the lowest priority and is designated as the Least Recently Used (LRU) entry 310. The entry 305 represents a plurality of entries that have varying priority intermediate the highest and lowest priorities. Those skilled in the art will appreciate that the priority of the entries 300, 305, 310 may be designated by physical location/order within the L1B Cache 230, priority tags/pointers/flags (not shown), or similar conventional methodologies.

When the L1B Cache 230 is full, with each entry 300-310 containing a valid entry, and a miss occurs in the L1B Cache 230, one of the existing entries in the L1B Cache 230 will need to be evicted and "refilled" or "replaced" with a desired new entry that is retrieved from, for example, the L2 Cache 235. Generally, a Cache Refill Control 315 in the L1B Cache Control 245 controls this refill. A Historic or Heuristic Information Check 320 receives the new entry from the L2 Cache 235 and determines the recent history of the new entry, such as whether the new entry has recently been located within the L1B Cache 230. The Cache Refill Control 315 utilizes the recent history information to determine the relative priority of the new entry and store the new entry in the L1B Cache 230 at the appropriate location or with the appropriate priority indicator. For example, if the new entry has recently been evicted from the L1B Cache 230 numerous times, then the Cache Refill Control 315 assigns a high priority to the new entry and stores the new entry as the Most Recently Used entry 300. On the other hand, if the new entry has not recently been evicted from the L1B Cache 230, then the Cache Refill Control 315 can assign a low priority to the new entry and store the new entry as the Least Recently Used entry 300. Alternatively, if the new entry has recently been evicted a relatively moderate number of times from the L1B Cache 230, then the Cache Refill Control 315 can assign a moderate priority to the new entry and store the new entry as one of the intermediate entries 305.

In one embodiment, the Historic Information Check 320 can be updated each time an entry is evicted from the L1B Cache 230. Accordingly, as shown in FIG. 3, the entries evicted from the L1B Cache 230 are delivered to both the L2 Cache 235 and to the Historic Information Check 320. The Historic Information Check 320 receives the evicted entry and updates its records, indicating that the entry has recently been evicted. Those skilled in the art will appreciate that in some embodiments it may be useful to retain only relatively recent information within the Historic Information Check 320, whereas in other embodiments it may be useful to retain a longer history of information. In either case, the timeliness of the information retained in the Historic Information Check 320 may be controlled by periodically flushing the Historic Information Check 320 or by removing "old" information that relates to incidents that occurred greater than a preselected time period earlier.

Figure 4:
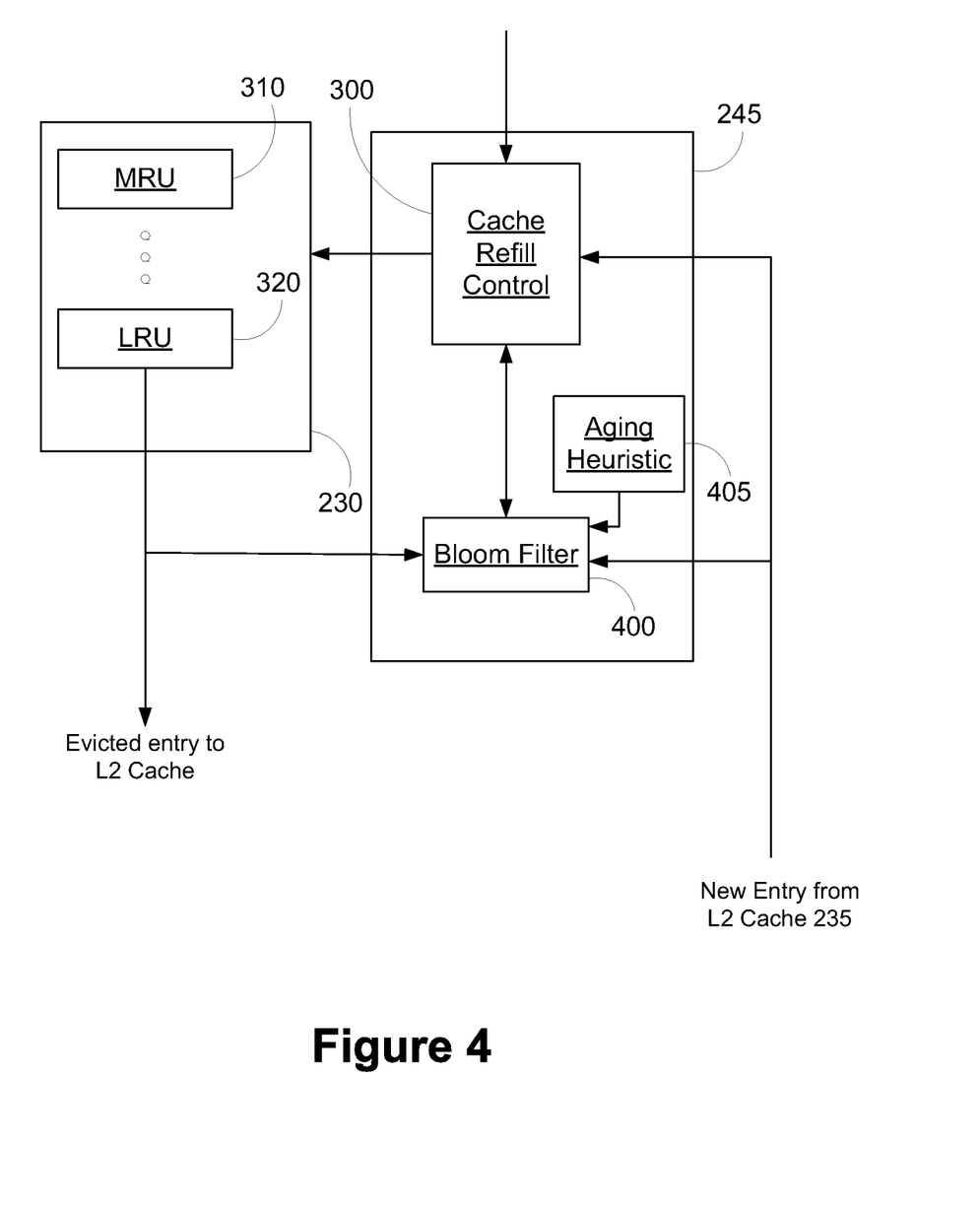
FIG. 4 is a block diagram of an alternative embodiment of the cache and cache control of FIG. 2.

Turning now to FIG. 4, one embodiment of the Historic Information Check 320 is illustrated. In this embodiment, a conventional Bloom filter 400 is used as the Historic Information Check 320. Generally, the Bloom filter 400 is a space-efficient probabilistic data structure that is used to test whether an element is a member of a set.

The Bloom filter 400 allows elements to be added and queries to be made. Each time an entry is evicted from the L1B Cache 230, its address is stored in the Bloom Filter 400. Likewise, each time an entry is received from the L2 Cache 235, its address is used to query the Bloom filter 400 to determine if it is already a member of the Bloom filter 400. If the Bloom filter 400 identifies the address of the entry received from the L2 Cache 235 as being present therein, then the entry has recently been evicted from the L1B Cache 230, and the Bloom filter 400 delivers a signal to the Cache Refill Control 300. The Cache Refill Control 300 uses the signal from the Bloom filter 400 to determine the priority of the entry received from the L2 Cache 235 so as to reflect the likelihood that this entry will be used again. That is, a hit in the Bloom filter 400 indicates that the entry has been recently evicted, and thus, is more likely to be accessed in the L1B cache 235 in the near future than an entry that misses in the Bloom filter 400.

Figure 5:
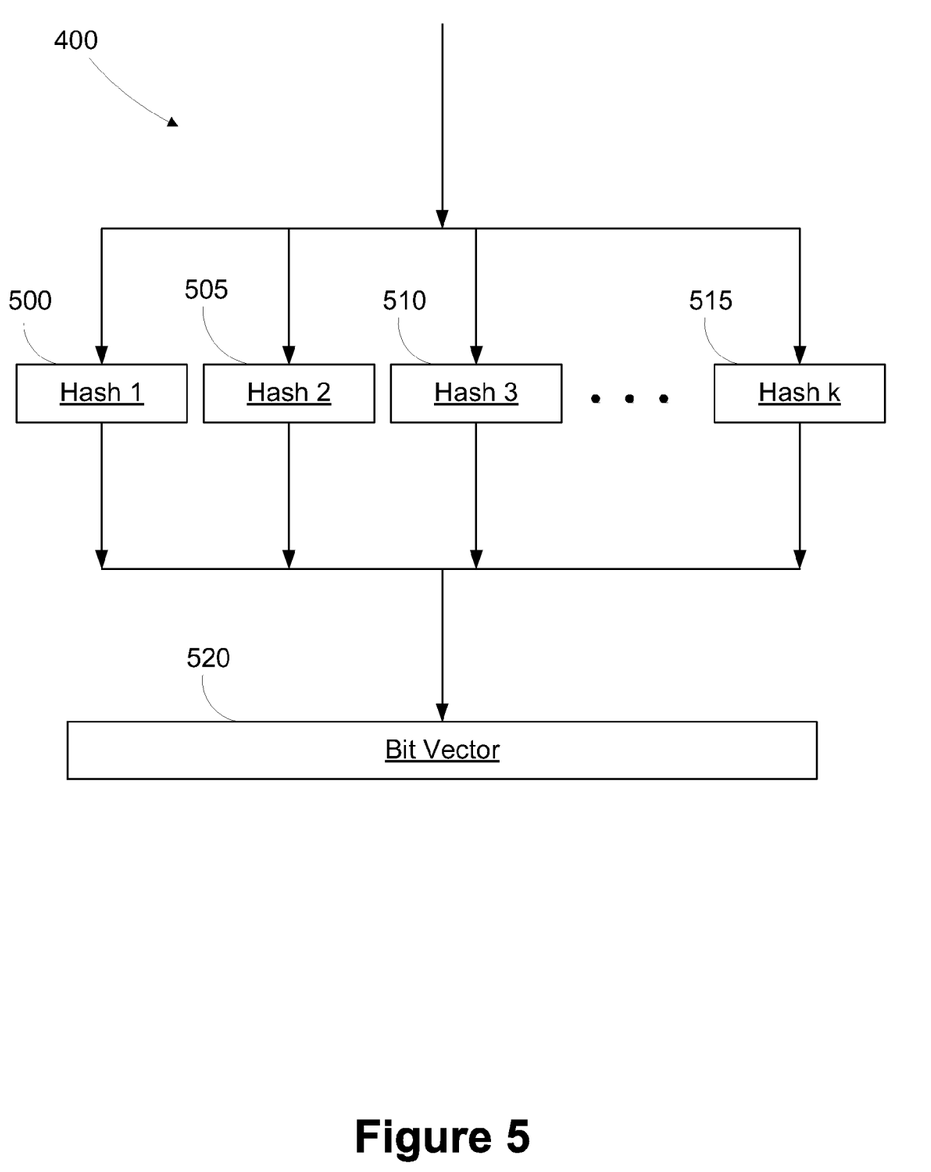
FIG. 5 is a block diagram of a Bloom filter used in the cache control of FIGS. 2-4.

As shown in FIG. 5, the bloom filter 400 includes a plurality of hashes 500, 505, 510, 515 and a bit vector 520. The address of the evicted entry is sent through k different hashes, which could be any transformation of the address that yields a bit position index in an N-bit bit vector 520. Each of these k bit indices are then set in the bit vector 520. Each of these k hashes would yield an index, and upon an eviction of an entry from the L1B Cache 235, each of the indices in the Bloom filter 400 would be set. The Bloom filter 400 can then be queried for set membership by sending an address through the hashes, and if every bit index of the k hashes 500, 505, 510, 515 is set to 1 in the Bloom filter 400, then the Bloom filter 400 returns an answer of "yes" to the question of set membership. If any of the bits returned by the hashes 500, 505, 510, 515 is not set to 1, then the address is not a member of the set.

Generally, the Bloom filter 400 captures a history of reuse on an entry-level granularity in order to distinguish between two types of entries that are brought into the L1B Cache 235: an entry that is probably never going to be seen again (predicted so because it has never been seen before), and an entry that has been seen (and evicted) previously, implying that it will be seen again.

Referring simultaneously to FIGS. 4 and 5, in some embodiments it may be useful to age or clear the Bloom filter 400 where the prioritization assigned by the Cache Refill Control 300 is primarily directed to recent reuse information by the L1B Cache 235, as opposed to more remote reuse information, which is less relevant. An Aging or Heuristic control 405 may be used to provide a form of aging or clearing of the bit vector 520. Numerous methodologies are envisioned for performing this task.

Figure 6:
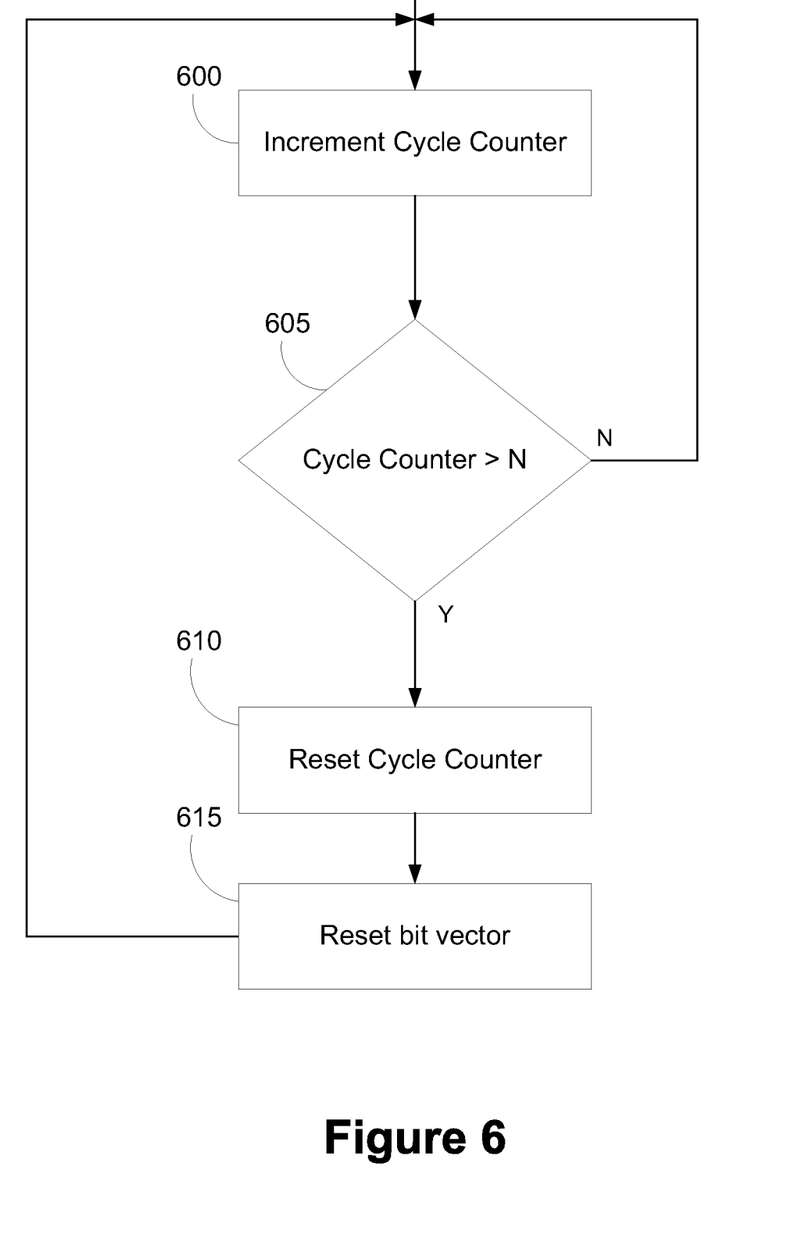
FIG. 6 is a flow chart describing one embodiment of an aging or heuristic process for the Bloom filter of FIGS. 4-5.

In one embodiment shown in the flow chart of FIG. 6, aging of the bit vector 520 is accomplished by clearing the bit vector 520 to all zeros after a preselected number of clock cycles. The process begins at block 600 with a clock cycle counter being incremented. At block 605, the cycle counter is compared to a preselected number N. If the cycle counter has not exceeded the preselected number N, then control returns to block 600, where the cycle counter is incremented in response to another clock cycle having occurred. On the other hand, if the clock cycle counter is determined to have exceeded the preselected number N, then control transfers to block 610 where the clock cycle counter is reset to zero and control transfers to block 615 where the bit vector 520 is reset to zero. Thereafter, the process repeats, such that the bit vector is periodically reset to zero, and thus, the bit vector 520 retains, at most N clock cycles of historic information regarding the entries that have been evicted from the L1B Cache 235. Those skilled in the art will appreciate that the clock cycle counter may be located within the historic information check 320, the bloom filter 400, the Aging or Heuristic control 405 or the like.

Figure 7:
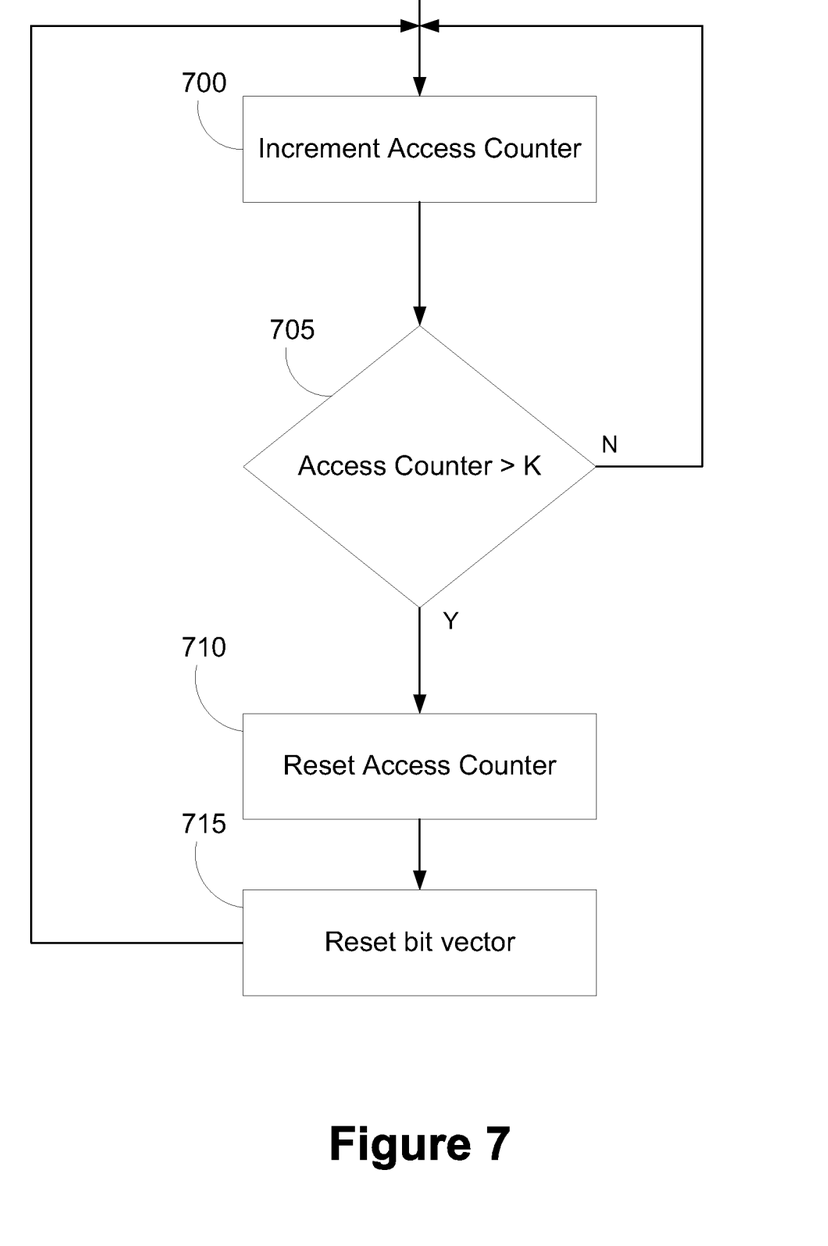
FIG. 7 is a flow chart describing an alternative embodiment of an aging or heuristic process for the Bloom filter of FIGS. 4-5.

In another embodiment shown in the flow chart of FIG. 7, the bit vector 520 is cleared after a preselected number of accesses to the L1B Cache 235. an access counter being incremented in response to the L1B Cache 235 receiving an inquiry. At block 705, the access counter is compared to a preselected number K. If the access counter has not exceeded the preselected number K, then control returns to block 700, where the access counter is incremented in response to another inquiry being received by the L1B Cache 235. On the other hand, if the access counter is determined to have exceeded the preselected number K, then control transfers to block 710 where the access counter is reset to zero and control transfers to block 715 where the bit vector 520 is reset to zero. Thereafter, the process repeats, such that the bit vector 520 is periodically reset to zero, and thus, the bit vector 520 retains, at most K access of historic information regarding the entries that have been evicted from the L1B Cache 235.

Figure 8:
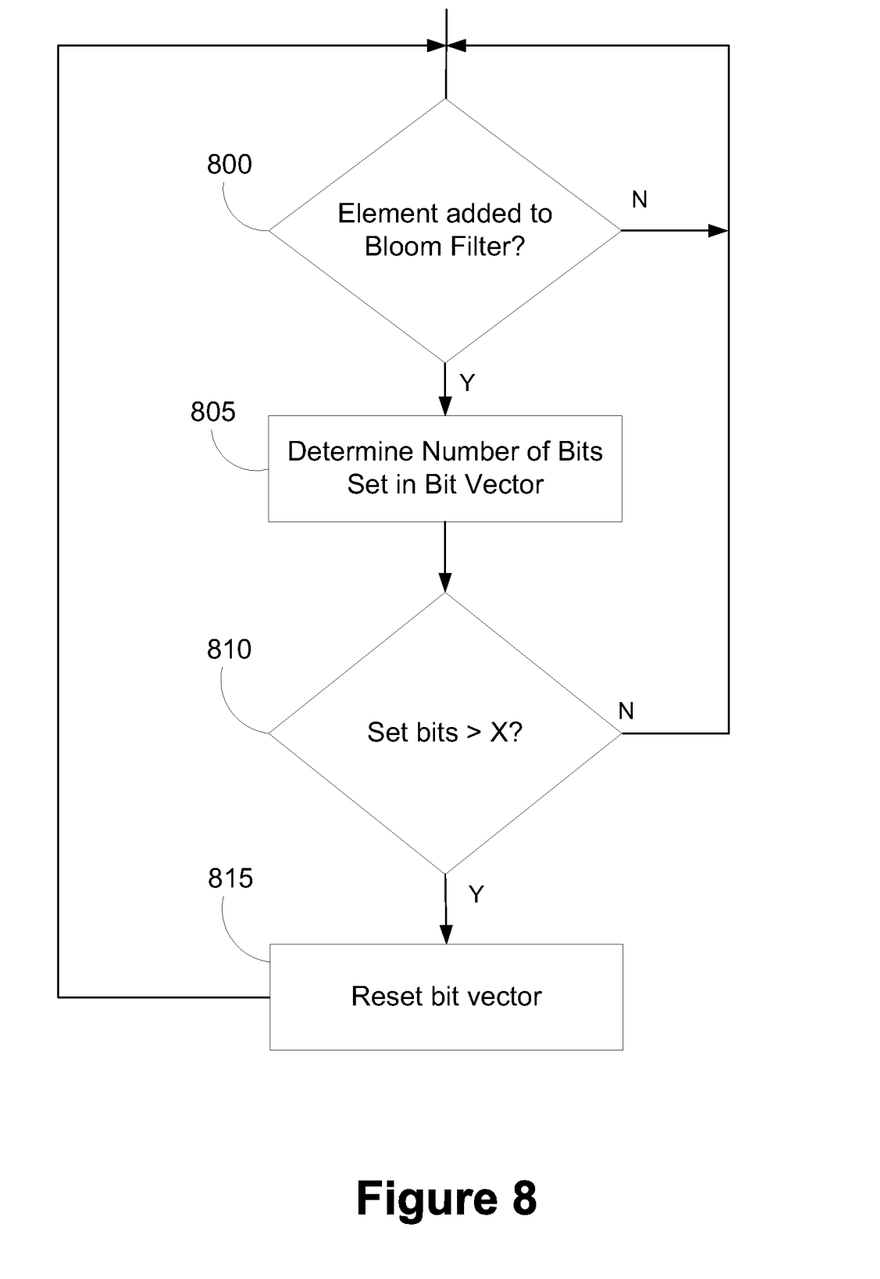
FIG. 8 is a flow chart describing an alternative embodiment of an aging or heuristic process for the Bloom filter of FIGS. 4-5.

In yet another embodiment shown in the flow chart of FIG. 8, the bit vector 520 is cleared in response to a preselected number of bits being set in the bit vector 520 to prevent the bit vector 520 from becoming too full. The process begins at block 800 with a determination being made as to whether an element has been added to the Bloom filter 400. Each time that it is determined that an element has been added to the Bloom filter 400, control transfers to block 805 where the number of bits that have been set in the bit vector 520 is determined. At block 810, the number of bits that have been set in the bit vector 520 is compared to a preselected number X. If the number of set bits is less than the preselected number X, then control transfers back to the decision block 800 where it awaits the next addition to the Bloom filter 400. On the other hand, if the number of bits set in the bit vector 520 is greater than the preselected number X, then control transfers to block 815 where the bit vector 520 is reset to zero. Thereafter, the process repeats, such that the bit vector 520 is periodically reset to zero, and thus, the bit vector 520 retains, at most X bits of historic information regarding the entries that have been evicted from the L1B Cache 235.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:

1. A method for controlling a cache, wherein said cache includes a plurality of storage locations, each having a priority associated therewith, wherein the cache evicts data from one or more of the storage locations based on the priority associated therewith, the method comprising:
    storing historical information;
    modifying the historical information from an initial state to a modified state indicating a plurality of different memory addresses associated with data being evicted from the cache;
    retrieving data from a secondary memory in response to a miss in the cache;
    assigning a priority to the retrieved data based on the historical information;
    storing the retrieved data in the cache with an indication of the assigned priority; and
    resetting the historical information to the initial state in response to a number of different memory addresses indicated by the historical information exceeding a preselected number.

2. A method, as set forth in claim 1, wherein storing historical information regarding data being evicted from the cache further comprises storing data indicative of a number of times the data has been evicted from the cache over a preselected period of time.

3. A method, as set forth in claim 2, wherein assigning the priority to the retrieved data based on the historical information further comprises assigning a priority to the retrieved data based on the number of times the data has been evicted from the cache over a preselected period of time.

4. A method, as set forth in claim 3, wherein assigning the priority to the retrieved data based on the number of times the data has been evicted from the cache over the preselected period of time further comprises assigning a higher priority to the data based on a higher number of evictions of the data.

5. A method, as set forth in claim 2, wherein storing the data indicative of the number of times the data has been evicted from the cache over the preselected period of time further comprises storing the data in a bloom filter.

6. A method, as set forth in claim 5, wherein resetting the historical information comprises resetting a bit vector in the bloom filter.

7. A method, as set forth in claim 6, wherein resetting the bit vector in the bloom filter comprises resetting the bit vector in response to detecting that a preselected number of bits are set in the bloom filter.

8. A method, set forth in claim 1, wherein storing the historical information comprises applying a plurality of hashes to each of the plurality of memory addresses to identify bit locations of a bloom filter and setting the bit locations of the bloom filter.

9. A cache controller associated with a cache, wherein the cache includes a plurality of storage locations, each having a priority associated therewith, wherein data is evicted from one or more of the storage locations based on the priority associated therewith, the cache control comprising:
    a historic information check adapted to store historical information indicating a plurality of different memory addresses associated with data being evicted from the cache;
    a cache refill control adapted to receive data retrieved from a secondary memory, assign a priority to the retrieved data based on the historical information, and store the retrieved data in the cache with an indication of the assigned priority; and
    wherein the historic information check is adapted to reset the historical information in response to a number of different memory addresses indicated by the historical information exceeding a preselected number.

10. A cache control, as set forth in claim 9, wherein the historic information check is adapted to store data indicative of a number of times the data has been evicted from the cache over a preselected period of time.

11. A cache control, as set forth in claim 10, wherein the cache refill control assigns a priority to the retrieved data based on the number of times the data has been evicted from the cache over a preselected period of time.

12. A cache control, as set forth in claim 11, wherein the cache refill control assigns a higher priority to the data based on a higher number of evictions of the data.

13. A cache control, as set forth in claim 11, wherein the cache refill control stores the data indicative of the number of times the data has been evicted from the cache over the preselected period of time in a bloom filter.

14. A cache control, as set forth in claim 13, wherein the historic information check is adapted to apply a plurality of hashes to each of the plurality of memory addresses to identify bit locations of a bloom filter and to set the bit locations of the bloom filter.

* * * * *